United States Patent
Hayashi

(10) Patent No.: US 9,829,500 B2
(45) Date of Patent: Nov. 28, 2017

(54) SPEED MONITORING DEVICE

(71) Applicant: OKUMA Corporation, Aichi (JP)

(72) Inventor: Yasukazu Hayashi, Aichi (JP)

(73) Assignee: OKUMA Corporation, Niwa-gun, Aichi (JP)

( * ) Notice: Subject to any disclaimer, the term of this patent is extended or adjusted under 35 U.S.C. 154(b) by 784 days.

(21) Appl. No.: 13/652,876

(22) Filed: Oct. 16, 2012

(65) Prior Publication Data

US 2013/0096868 A1 Apr. 18, 2013

(30) Foreign Application Priority Data

Oct. 18, 2011 (JP) .................................. 2011-228874

(51) Int. Cl.
*G01P 1/10* (2006.01)
*G05B 19/18* (2006.01)

(52) U.S. Cl.
CPC .............. G01P 1/103 (2013.01); G05B 19/18 (2013.01)

(58) Field of Classification Search
CPC .............. G01D 5/2454; G01D 5/2492; G01D 5/24409; G01D 5/24452; G01D 5/12448; G01D 5/12449; G01P 1/103; G05B 19/04; G05B 19/18; G05B 19/231; G05B 19/404; H04N 1/107
USPC ............. 702/142, 91, 150; 324/760, 207.25; 290/40, 208
See application file for complete search history.

(56) References Cited

U.S. PATENT DOCUMENTS

| 4,143,310 | A | * | 3/1979 | Fujinawa | G05B 19/232 318/571 |
| 4,628,441 | A | * | 12/1986 | Johnstone | G05B 19/232 318/603 |
| 4,635,183 | A | * | 1/1987 | Isobe | G05B 19/058 345/440.1 |
| 4,890,046 | A | * | 12/1989 | Kurakake | G05B 19/404 318/561 |

(Continued)

FOREIGN PATENT DOCUMENTS

| DE | 19639907 A1 | 4/1997 |
| DE | 19962022 A1 | 6/2001 |
| JP | 8137526 A | 5/1996 |

OTHER PUBLICATIONS

McNamara, "GPS for Dummies," 2004, Wiley Publishing, Inc., pp. 56-58.*

(Continued)

*Primary Examiner* — Hyun Park
*Assistant Examiner* — Liam R Casey
(74) *Attorney, Agent, or Firm* — Osha Liang LLP

(57) ABSTRACT

There is provided a speed monitoring device which can use a low resolution position sensor and provide a high speed response without false detection. The speed monitoring device stores, in a memory unit, a permitted margin PM, a comparison distance VC which is a maximum movement distance permitted for a moving element within one cycle period, and positional data $P(t-nT)$ (n is a natural number equal to or less than M) of the moving element obtained from the present time t to M cycles ago. During speed determination, whether $|P(t)-P(t-nT)|>VC*n+PM$ holds true is determined for every integer n from 1 to M. When the inequality holds true, it is determined that the speed exceeds the speed limit.

6 Claims, 3 Drawing Sheets

(56) References Cited

U.S. PATENT DOCUMENTS

| | | | |
|---|---|---|---|
| 5,805,103 A | | 9/1998 | Doi et al. |
| 6,118,553 A | * | 9/2000 | Berg ...................... H04N 1/107 |
| | | | 358/473 |
| 6,768,956 B2 | * | 7/2004 | Hayashi .......................... 702/91 |
| 2005/0256640 A1 | * | 11/2005 | Sigurdsson .......... G01C 21/005 |
| | | | 701/468 |
| 2006/0239733 A1 | * | 10/2006 | Choi .................. G03G 15/6567 |
| | | | 399/396 |
| 2007/0120713 A1 | * | 5/2007 | Hayashi .......................... 341/51 |
| 2011/0268628 A1 | * | 11/2011 | Warhurst ............. B01L 3/0234 |
| | | | 422/511 |

OTHER PUBLICATIONS

Patent Abstracts of Japan, Publication No. JP8137526, Published on May 31, 1996, 1 page.
Second Office Action issued in corresponding Chinese Application No. 201210397159.2, dated Sep. 30, 2016 (11 pages).
German Office Action in corresponding German Application No. 102012020455.8 dated Apr. 29, 2015 (17 pages).

\* cited by examiner

SPEED MONITORING DEVICE

PRIORITY INFORMATION

This application claims priority to Japanese Patent Application No. 2011-228874, filed on Oct. 18, 2011, which is incorporated herein by reference in its entirety.

BACKGROUND

Technical Field

The present invention relates to a speed monitoring device for monitoring whether the speed of a moving element is within the safe speed limit, based on positional data output from a position detector.

Related Art

In recent years, the probability of occurrence of accidental malfunction of control equipment has increased due to increase in the size of circuits mounted in control equipment, increase in the speed of signal processing, miniaturization of integrated circuits, and increase in complexity of software integrated in the control equipment. In response to this, control equipment has been equipped with a safety function for safely stopping a moving machine which is an object to be controlled in the event of malfunction of the control equipment.

Further, as a device for detecting malfunction of the control equipment, a speed monitoring device for monitoring whether the speed of the moving element exceeds the safe speed limit is mounted in a control device equipped with a safety function.

SUMMARY

A general speed monitoring device for monitoring a safe speed detects a speed based on a difference between positional data obtained during each constant cycle by a position sensor which detects positions of the moving element, and monitors whether that speed exceeds a predetermined speed. Because the safe speed is normally a relatively low speed, in order to detect a speed with sufficient resolution, it is necessary to extend a cycle for performing subtraction processing or enhance resolution of the position sensor. However, extending the cycle for performing the subtraction processing has the disadvantage of degradation in responsiveness of speed detection. In other words, a response time from when the moving element reaches a dangerous speed until the moving element is actually stopped is also extended, resulting in the problem of reduced security capability. Further, enhancing the resolution of the position sensor enables detection of a low speed in a short time. However, there is a problem that even for a safe and slight change in positions, as long as it is a sudden movement caused by, for example, mechanical backlash, the movement is erroneously detected as a dangerous speed. In conventional processing, in order to avoid the problem of such false detection, it is determined that there is an over-speed only when the over-speed is continuously detected several times. Avoiding false detection in this manner results in the problem of degraded responsiveness in speed detection even if the resolution of the position sensor is enhanced. In addition, enhancing the resolution of the position sensor causes the problem of increased cost of the position sensor.

For these reasons, a speed monitoring device which can employ a low resolution position sensor and provide a high speed response without false detection has been desired.

The present invention is made in light of the above-described situations, and the purpose of the present invention is to provide a speed monitoring device which can respond at a high speed without false detection and employ an inexpensive and low-resolution position sensor.

A speed monitoring device of the present invention monitors a speed of a moving element based on positional data output from a position detector every constant cycle T, and the speed monitoring device has a memory unit which stores at least a permitted movement margin PM, a comparison distance VC which is a maximum movement distance permitted for the moving element within one cycle period, and positional data $P(t-nT)$ (n is a natural number equal to or less than M) of the moving element obtained from present time t to M cycles ago, and a speed determination unit which determines that the speed exceeds a speed limit when $|P(t)-P(t-nT)|>VC*n+PM$ holds true for at least one of all integers n from 1 to M.

In a preferred embodiment, the speed determination unit sets a value of M to be sufficiently smaller than Mmax which is a predetermined maximum value for M immediately after speed monitoring is started, and then increases M gradually and fixes it to Mmax when M becomes Mmax.

In another preferred embodiment, when determination as to whether the speed exceeds the speed limit is started, the memory unit replaces any past positional data $P(t-nT)$ until M cycles ago with positional data $P(t)$ obtained when the determination is started.

In still another preferred embodiment, the speed monitoring device has two modes, one for monitoring whether the speed exceeds the speed limit and the other for monitoring whether the speed is reduced, and when the mode of monitoring whether the speed is reduced is selected, a value of M is set to be smaller than that for the mode of monitoring whether the speed exceeds the speed limit.

With the present invention, even if there is a sudden movement in a short time, determination that the speed limit is exceeded is not made unless the movement exceeds a permitted movement margin PM. As such, if the permitted movement margin PM is greater than an amount of the sudden movement caused by mechanical backlash, etc., there is no risk of false detection even if a cycle T for performing the subtraction processing is shortened as desired. This enables shortening of the cycle T and rapid response to a dangerous movement beyond the permitted movement margin PM. In addition, by increasing the permitted movement margin PM to be greater than the resolution of the position sensor, there is no risk of malfunction caused by digitizing errors due to the resolution of the position sensor, and the low resolution position sensor can be used. Further, by increasing the value of M, a speed is monitored based on a positional difference for a long time interval, and a sufficient speed resolution can be achieved even if the low resolution position sensor is used. Accordingly, it is possible to use the low resolution sensor and realize a speed monitoring device which can provide a high speed response without false detection.

DETAILED DESCRIPTION

Hereinafter, an embodiment of the present invention will be described based on the drawings.

Figure 1:
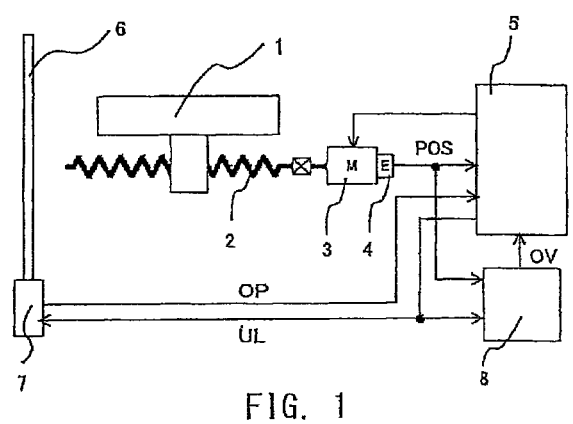
FIG. 1 illustrates a single-axis numerical control system including a speed monitoring device as an embodiment of the present invention.
Figure 2:
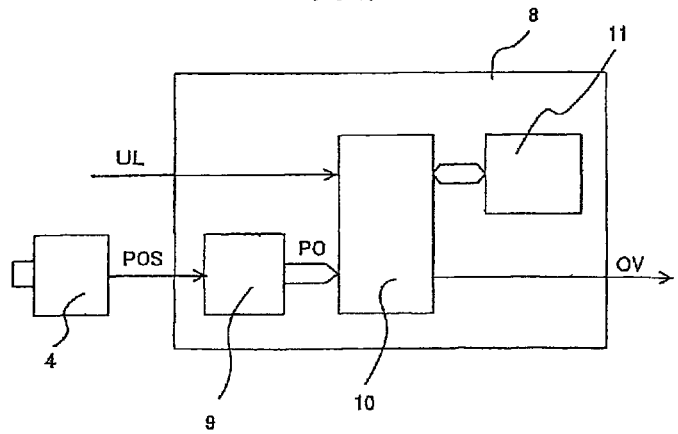
FIG. 2 illustrates a block diagram of a speed monitoring device 8 shown in the block diagram of FIG. 1.
Figure 3:
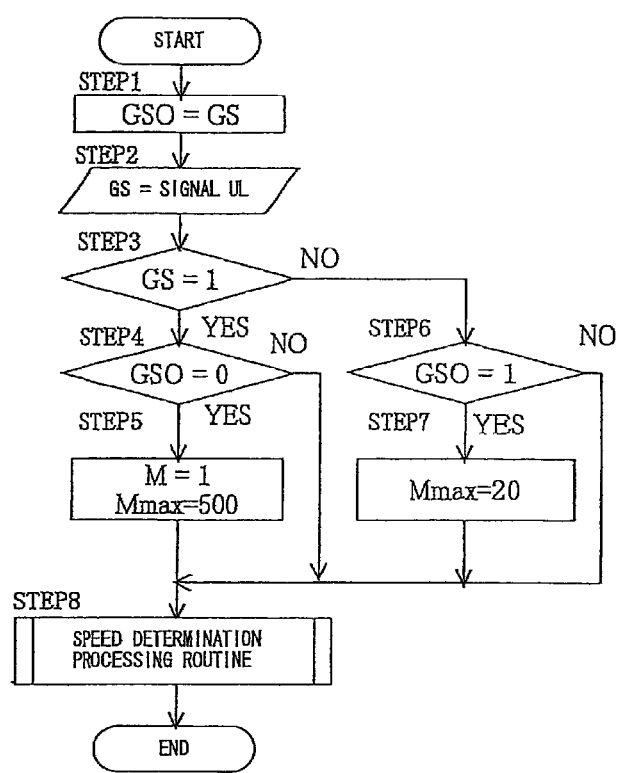
FIG. 3 illustrates a flowchart showing a processing operation by a microcomputer 10 shown in the block diagram of FIG. 2.
Figure 4:
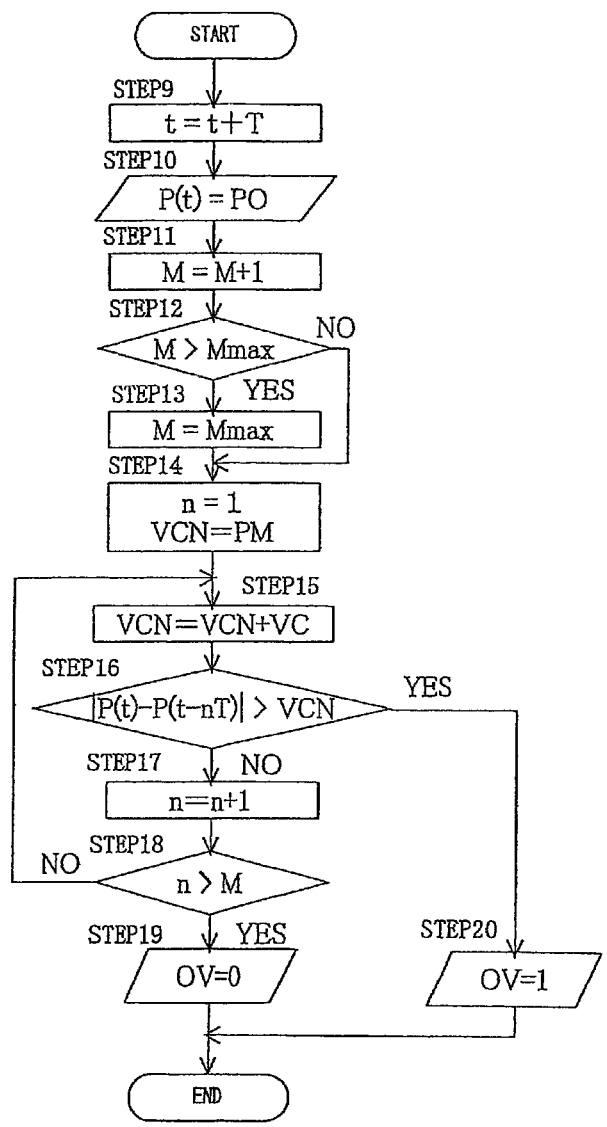
FIG. 4 illustrates a flowchart showing a processing operation of a speed determination processing routine shown in STEP 8 of FIG. 3.

FIG. 1 illustrates a single-axis numerical control system including a speed monitoring device of the present invention. In addition, FIG. 2 illustrates a block diagram showing a speed monitoring device 8 shown in the block diagram of FIG. 1. Further, FIG. 3 illustrates a flowchart showing a processing operation by a microcomputer 10 shown in the block diagram of FIG. 2. Still further, FIG. 4 illustrates a flowchart showing contents of a speed determination processing routine shown in STEP 8 of FIG. 3.

In FIG. 1, when a rotation shaft of a servomotor 3 rotates, a ball screw mechanism 2 directly connected to the rotation shaft causes a table 1 to move linearly. On the servomotor 3, a 250 pulse per revolution encoder 4 serving as a position sensor is mounted and detects an amount of revolution of the rotation shaft and outputs the result as a signal POS. A numerical control device 5 controls a motor current based on speed information obtained by converting the output signal POS from the encoder 4 and then controls the speed and position of the servomotor 3. In addition, the numerical control device 5 performs, for example, positioning control of the table 1 according to position information of the table 1 obtained by converting the output signal POS from the encoder 4 and an NC program which is input in advance. A safety switch 7 unlocks a guard 6 based on an unlock signal UL from the numerical control device 5. Further, when the guard 6 is open, the safety switch 7 outputs a signal OP indicating that the guard 6 is open. Further, the speed monitoring device 8 detects a speed of the table 1 serving as a moving element from the output signal POS from the encoder 4, and if a moving speed exceeds the safe speed, outputs an over-speed signal OV to the numerical control device 5.

If both of the over-speed signal OV from the speed monitoring device 8 and the controlled speed for the table 1 are equal to or less than the safe speed, the numerical control device 5 outputs the unlock signal UL, to thereby allow the guard to be opened. Further, if the unlock signal UL is output, and the speed monitoring device 8 outputs the over-speed signal OV, the numerical control device 5 determines that it is a dangerous state and causes the servomotor 3, etc. to make an emergency stop to thereby ensure security. In addition, if the signal OP indicating that guard is open is input while the unlock signal UL is not output, the numerical control device 5 also causes the servomotor 3, etc. to make an emergency stop to thereby ensure security.

In FIG. 2, the speed monitoring device 8 is composed of an encoder interface 9, a microcomputer 10, and a random access memory 11. The encoder interface 9 converts the output signal POS provided based on pulses from the encoder 4 to positional data PO serving as numerical information. Here, because a ball screw lead of the ball screw mechanism 2 is 50 mm and the position sensor is 250 pulses per revolution, the resolution of the positional data PO is 0.2 mm. For each time, the microcomputer 10 performs processing shown in the flowcharts in FIGS. 3 and 4 at 10 ms per cycle (T=10 ms).

In STEP 1, a previously-read parameter GS indicating that the guard is open is stored in a parameter GSO. In STEP 2, the unlock signal UL is read into the parameter GS. While the unlock signal UL=0 indicates a locked state, the unlock signal UL=1 indicates an unlocked state. In STEP 3, if it is the unlocked state (GS=1), STEPs 4 and 5 are carried out, while if it is the locked state (GS=0), STEPs 6 and 7 are carried out.

In STEPs 4 to 7, a parameter M indicating the number of repeats of speed calculation processing (described below) and a parameter Mmax indicating a maximum number of repeats are set. Specifically, if it is an unlocked state at present (GS=1 and Yes in STEP 3) and it is also an unlocked state last time (GSO=1 and No in STEP 4), values of the previously set parameters M and Mmax are maintained without changes. If it is an unlocked state at present (GS=1 and Yes in STEP 3) and it was a locked state last time (GSO=0 and Yes in STEP 4), the open and closed states of the guard 6 change between last time and this time, and speed monitoring is restarted. In this case, a parameter M is set to 1, and then a parameter Mmax is set to 500.

Meanwhile, if it is a locked state at present (GS=0 and No in STEP 3) and it was also a locked state last time (GSO=10 and No in STEP 6), values of the previously set parameters M and Mmax are maintained without changes. If it is a locked state at present (GS=0 and No in STEP 3) and it was an unlocked state last time (GSO=1 and Yes in STEP 7), the open and closed states of the guard 6 change between last time and this time. In this case, the parameter Mmax is set to 20. After completion of the setting of these parameters M and Mmax, a speed determination processing routine in STEP 8 is carried out.

The speed determination processing routine is carried out according to the steps shown in FIG. 4. That is, in STEP 9 of FIG. 4, time t is updated by adding a cycle T to a parameter of time t. In STEP 10, positional data PO output by the encoder interface 9 is read out, and the data is set as a parameter P(t) in the random access memory 11. During STEPs 11, 12, and 13, 1 is added to the parameter M, and only if the parameter M exceeds the parameter Mmax, processing is carried out such that the parameter M is set to be the parameter Mmax so that the parameter M does not exceed the parameter Mmax.

In STEP 14, a parameter n is set to 1 and a permitted movement margin is set as a parameter VCN. In STEP 15, a parameter VC indicating a comparison distance is added to the parameter VCN. The parameter PM indicating the permitted movement margin is set for 1,000 mm in advance. Further, if the moving element moves at 2000 mm/min, a distance of 0.333 mm over which the moving element moves in 10 ms is set as a comparison distance for the parameter VC.

In STEPs 15, 16, 17, and 18, an absolute value of P(t)−P(t−nT) indicating a movement amount in time nT is compared with the parameter VCN, and as long as the movement amount in time nT does not exceed VCN (=VC*n+PM), a single n continues to be added to repeat the processing in STEPs 15, 16, 17, and 18 M times. If the movement amount in time nT does not exceed VCN even once, in STEP 19, the over-speed signal OV is set to 0 and output. Further, if the movement amount in time nT exceeds VCN at least once, in STEP 20, the over-speed signal OV is set to 1 and output.

Although, in STEP 15, the parameter VCN is calculated by addition processing as the calculation is simple, the parameter VCN may also be calculated by multiplication, VCN=VC*n+PM. Further, in STEPs 3 to 7 in FIG. 3, the speed determination processing is carried out by switching values of the parameter Mmax between two modes, one for a guard-locked state and the other for a guard-unlocked state. Because whether the speed exceeds the safe speed limit is monitored while the guard is open, it is necessary to detect the safe speed accurately in order to ensure safety. The greater the parameter M becomes, the better the speed detection accuracy becomes. In contrast, whether the speed becomes equal to or less than the safe speed at which the guard is unlocked is monitored while the guard is locked. It is not determined that the speed is within the safe speed limit even if the speed is equal to or less than the safe speed limit during an M−1 cycle, unless M cycles have not elapsed that is a case where the parameter M is large and the moving element moved at a high speed M cycles ago. Therefore, if the parameter M is large, there is the problem of delay in opening the guard, resulting in deterioration of workability. When the speed is monitored to be equal to or less than the safe speed limit at which the guard is unlocked, there is no problem in making the parameter M small even if the speed exceeds the safe speed limit to some extent, as long as the speed can be instantly reduced to the safe speed after the guard is open, to thereby ensure safety. Further, when the speed is monitored to be equal to or less than the safe speed limit at which the guard is open, a controlled speed is also monitored to be equal to or less than the safe speed limit, and therefore, the moving element does not exceed the safe speed limit or make an emergency stop when the guard is unlocked, unless there is a malfunction on the numerical control device side. Accordingly, the processing in FIG. 3 includes two modes, one for monitoring whether the speed exceeds the safe speed limit while the guard is open, and the other for monitoring whether the speed is reduced to the safe speed limit while the guard is locked. When the mode for monitoring the speed is reduced to the safe speed limit is selected, a small value of M is set to the mode for monitoring whether the speed exceeds the safe speed limit, to thereby improve responsiveness in opening the guard. As such, although, when M=500, the guard is unlocked at least 5 seconds after the safe speed is achieved, when M=20, the guard can be opened within 0.2 seconds after the safe speed is achieved.

In STEP 5 of FIG. 3, when the guard is changed from the locked state to the unlocked state, the parameter M is once changed to 1. If a value of the parameter M is large, a past movement at a high speed while the guard was locked is also evaluated in the determination processing in STEP 16. Therefore, even if the safe speed is secured after the guard is unlocked, there is the problem that an over-speed is detected erroneously due to the past positional data obtained before the guard is unlocked. For this reason, immediately after speed monitoring is started, M=1 is adopted, and the parameter M is set to be sufficiently smaller than the parameter Mmax so as not to evaluate the positional data which was obtained during the high speed movement before the monitoring starts. Another method of addressing this problem is replacing the past positional data P(t−nT) obtained M cycles ago with P(t) immediately after speed monitoring is started, using the parameter M which is always fixed to the parameter Mmax. However, this method has the disadvantage of time-consuming processing in replacement of the past positional data with P(t).

Here, if the number of pulses of the encoder corresponds to a resolution of 250 pulses per revolution and the ball screw lead is 50 mm, as in the single-axis numerical control system in FIG. 1, a minimum detectable value of the distance is 1/250*50 mm=0.2 mm. If a movement distance during a sampling cycle T=10 ms is less than 0.2 mm, that is, if the moving speed is less than 0.2 mm*100*60=1200 mm/min, positional data can never be detected during a short cycle of one sampling cycle (10 ms), and as a result, no speed can be obtained. In other words, if the safe speed is less than 1200 mm/min, the encoder of a low resolution of 250 pulses per revolution cannot determine whether the safe speed is exceeded, and as a result, monitoring cannot be carried out accurately. However, because, during speed monitoring, the single-axis numerical control system shown in FIG. 1 evaluates and monitors the speed based on a movement amount every 10 ms, from 10 ms to 5 seconds, an actual speed resolution is 0.2 mm*(60/5)=2.4 mm/min. In addition, because the single-axis numerical control system determines the speed by adding a permitted movement margin of 1 mm which is over an encoder's resolution of 0.2 mm, the system is not affected by digital errors caused by the insufficient resolution of the encoder. Further, even if slight but sudden distance changes occur due to, for example, mechanical backlash or impact, there is no problem of false detection of over-speed, as long as the movement is sufficiently less than 1 mm. Even if the speed of a sudden movement of approximately 1 mm far exceeds the safe speed limit, safety can be fully secured, as long as the positional change is within such a level. Still further, if the moving element suddenly moves over 1 mm in 10 ms, the movement can be instantly detected as an over-speed, and therefore, it is possible to detect a dangerous state with a high speed response.

What is claimed is:

1. A numerical control system comprising:
 a moving element;
 a motor that moves the moving element;
 a position detector that detects a position of the moving element or the motor and outputs a detection value;
 a speed monitoring device that converts the detection value output from the position detector into positional data of the moving element every sampling cycle period T, wherein the sampling cycle period T is predefined, and monitors the speed of the moving element, the speed monitoring device comprising:
  a memory that stores at least a permitted movement margin PM, a comparison distance VC that is a maximum movement distance permitted for the moving element within one cycle T, the positional data P(t) of the moving element obtained at a present time t, and the positional data P(t−nT) of the moving element obtained at a time t−nT, for all integers n between 1 and a value, M; and
  a speed determination unit that compares, every sampling cycle period T, |P(t)−P(t−nT)| to VC*n+PM for all integers n between 1 and M until |P(t)−P(t−nT)|>VC*n+PM holds true for at least one of all integers n between 1 and M, and determines that the speed exceeds a speed limit when there is an integer n for which |P(t)−P(t−nT)|>VC*n+PM holds true,
  wherein M is an integer greater than or equal to 2 except at a start time of monitoring the excessive speed; and
  a numerical control device that calculates a speed of the moving element based on the detection value output from the position detector and controls driving of the motor from the determined speed exceeding the speed limit.

2. The numerical control system according to claim 1, wherein the value of M is set to be sufficiently smaller than Mmax that is a predetermined maximum value for M immediately after speed monitoring is started, and then M is increased gradually and fixed to Mmax when M becomes Mmax.

3. The numerical control system according to claim 1, wherein when determination as to whether the speed exceeds the speed limit is started, any past positional data P(t−nT) obtained for the integer n between 1 and M is replaced with the positional data P(t) obtained when the determination is started.

4. The numerical control system according to claim 1, wherein:
　the speed monitoring device has two modes, one that monitors whether the speed exceeds the speed limit and the other that monitors whether the speed is reduced; and
　when the mode that monitors whether the speed is reduced is selected, the value of M is set to be smaller than that for the mode that monitors whether the speed exceeds the speed limit.

5. The numerical control system according to claim 1, wherein the permitted movement margin PM is greater than an amount of a sudden movement caused by mechanical backlash.

6. The numerical control system according to claim 1, wherein the permitted movement margin PM is greater than the resolution of the position detector.

* * * * *